(No Model.)
L. Q. & A. BRIN.
MANUFACTURE OF ANHYDROUS OXIDE OF BARIUM
No. 338,628. Patented Mar. 23, 1886.
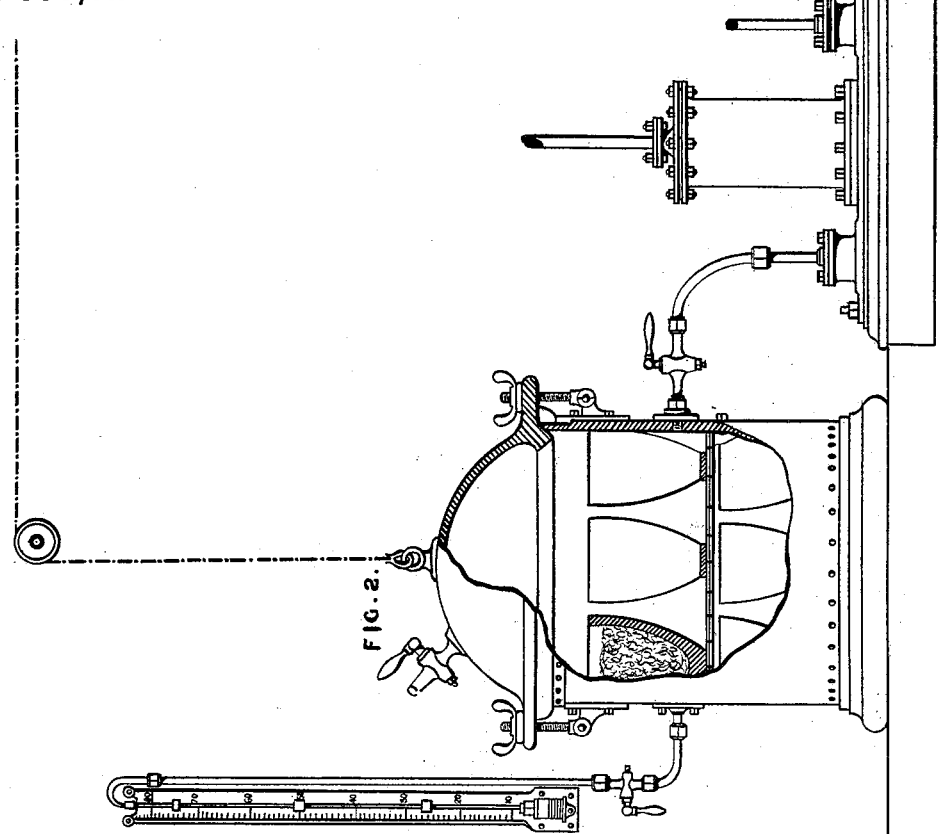
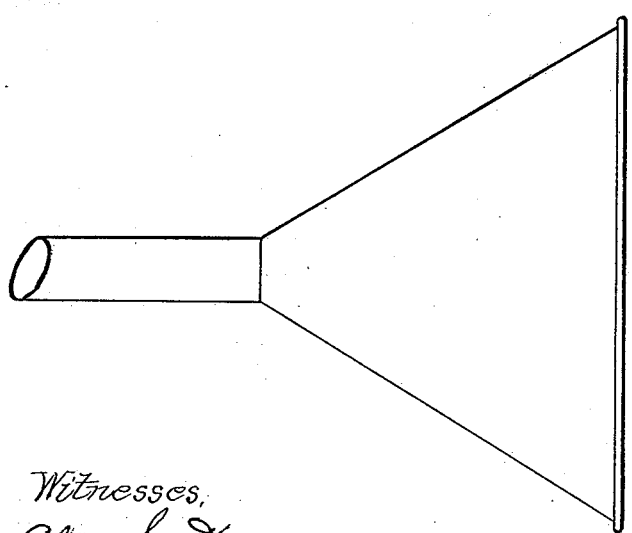
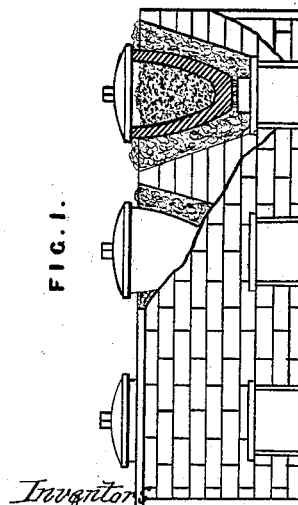

UNITED STATES PATENT OFFICE.

LÉON QUENTIN BRIN AND ARTHUR BRIN, OF PARIS, FRANCE, ASSIGNORS TO SAMUEL WILKINS CRAGG, OF BALTIMORE, MARYLAND.

MANUFACTURE OF ANHYDROUS OXIDE OF BARIUM.

SPECIFICATION forming part of Letters Patent No. 338,628, dated March 23, 1886.

Application filed March 19, 1885. Serial No. 159,439. (No specimens.) Patented in England January 5, 1885, No. 151.

*To all whom it may concern:*

Be it known that we, LÉON QUENTIN BRIN and ARTHUR BRIN, civil engineers, citizens of the Republic of France, and residing in Paris, in the said Republic, have invented a certain Manufacture of Anhydrous Oxide of Barium, (for which we have applied for a patent in Great Britain, No. 151, dated January 5, 1885,) of which the following is a specification.

The object of our invention is to prepare a chemically-pure anhydrous oxide of barium, or product of baryta free from carbonic acid, nitric acid, and moisture, in a manner which will render the product commercially available for use in the process of separating the oxygen and nitrogen of atmospheric air, as described in the specification of our application for a patent of even date with this; but it may be used for any other purpose to which it is or may be applicable.

According to our invention we take crystals of nitrate of baryta, which are dried and placed in open crucibles or equivalent vessels—such, for example, as are shown in Figure 1 of the accompanying drawings—and heated to an exceedingly high temperature—say 1000° to 1500° centigrade. This temperature should be gradually attained, and should be continued for such a time as will cause the contents of the crucibles to become solid and assume a spongy appearance. We then close the crucibles or vessels and keep the contents at a white heat for a considerable time—say about four hours. The crucibles or vessels are then removed to an air-tight chamber—such, for example, as is illustrated in Fig. 2—in which a vacuum or partial vacuum is created, or from which air or gases containing carbonic acid or moisture are otherwise excluded—for instance, by filling the interior of the chamber with a gas, such as nitrogen, from which the baryta cannot take up carbonic acid or moisture. The contents of the crucibles or vessels are allowed to cool in the said chamber, which should, when a vacuum is employed, be provided with testing or controlling instruments—such as a cock, safety-valve, and manometer—for testing and controlling the vacuum and avoiding accidents.

In the drawings an ordinary pump is shown for exhausting the air-tight chamber. The material in the crucibles after cooling in this chamber will be found to be a cohering spongy or porous mass of very pure anhydrous oxide of barium or baryta free from carbonic acid, nitric acid, and moisture, and admirably suited for use in our aforesaid process for obtaining the oxygen and nitrogen of the atmosphere.

Having now particularly described and ascertained the nature of our said invention, and in what manner the same is to be performed, we declare that what we claim is—

In the process of making anhydrous oxide of barium or baryta by calcining barium nitrate, the improvement herein described, which consists in excluding moisture and carbonic acid from the baryta while cooling, either by exhausting the air of the chamber or filling the same with a gas destitute of moisture and carbon dioxide, substantially as specified.

In testimony whereof we have signed our names to this specification in the presence of two subscribing witnesses.

LÉON QUENTIN BRIN.
ARTHUR BRIN.

Witnesses:
SAMUEL W. CRAGG,
ED. KOCH.
   *Both of 6 Rue Volney.*